(12) United States Patent
Stoner

(10) Patent No.: US 8,636,517 B1
(45) Date of Patent: Jan. 28, 2014

(54) EDUCATIONAL GAME FOR ENHANCED WORD LEARNING WHEN MATCHING SIMILAR WORDS IN DIFFERENT LANGUAGES

(76) Inventor: Theodore Stoner, Denver, CO (US)

( * ) Notice: Subject to any disclaimer, the term of this patent is extended or adjusted under 35 U.S.C. 154(b) by 149 days.

(21) Appl. No.: 12/931,759

(22) Filed: Feb. 9, 2011

Related U.S. Application Data

(60) Provisional application No. 61/337,945, filed on Feb. 11, 2010.

(51) Int. Cl.
G09B 19/22 (2006.01)

(52) U.S. Cl.
USPC ......................................................... 434/129

(58) Field of Classification Search
USPC ......................................................... 434/129
See application file for complete search history.

(56) References Cited

U.S. PATENT DOCUMENTS

| | | | | |
|---|---|---|---|---|
| 5,141,235 A | * | 8/1992 | Hernandez | 273/308 |
| 5,438,232 A | * | 8/1995 | Inoue et al. | 310/328 |
| 6,099,318 A | * | 8/2000 | McLeod et al. | 434/129 |
| 6,109,609 A | * | 8/2000 | Ekberg | 273/236 |
| 6,447,300 B1 | * | 9/2002 | Greenberg | 434/188 |
| 6,761,356 B1 | * | 7/2004 | Jacobson et al. | 273/292 |
| 7,029,281 B1 | * | 4/2006 | Rathyen | 434/129 |
| 2002/0043764 A1 | * | 4/2002 | Imhof | 273/292 |

* cited by examiner

*Primary Examiner* — Kurt Fernstrom
*Assistant Examiner* — Dolores Collins
(74) *Attorney, Agent, or Firm* — Edwin H. Crabtree; Ramon L. Pizarro

(57) ABSTRACT

An educational game used for enhanced word learning of words in a different language. In one format using playing cards, a player picks a first card from a plurality of like cards in a card deck. The player then turns the first card over to reveal an English word with its corresponding image. The player now looks at a plurality of second cards with a Spanish word or other language word, which are placed face up to see if he or she can quickly match the English word with the Spanish word. If the player picks the correct corresponding word, the card is turned over to reveal the word and its corresponding image. By continuous playing the game, the players quickly can learn words in a different language prior to associating the word with its image.

14 Claims, 3 Drawing Sheets

(FRONT SIDE)

(BACK SIDE)

MATCH (FRONT SIDE)

(BACK SIDE)

(WEB SITE GAME)

(WEB SITE GAME)

EDUCATIONAL GAME FOR ENHANCED WORD LEARNING WHEN MATCHING SIMILAR WORDS IN DIFFERENT LANGUAGES

This application is based on and claims the benefit of a provisional patent application Ser. No. 61/337,945, filed in the U.S. Patent and Trademark Office on Feb. 11, 2010, by the subject inventor.

BACKGROUND OF THE INVENTION (a) Field of the Invention

This invention relates to an educational game for children and adults that can be played as a card game with playing cards, on a video screen attached to a computer, TV, and portable, handheld electronic devices such as a smart phone, and other game formats, with one or more players, and more particularly, but not by way of limitation, to a matching word and image game that provides for enhanced learning of a new word or descriptor and matching the word with the same word in a different language and prior to matching the two word's images.

(b) Discussion of Prior Art

Heretofore, there have been a variety of educational games for learning a language and other subjects using a card deck, a board game, a video game, a computer game, for matching like words or descriptors with an image of the words. When playing these types of games, it has been found a player or players prioritize memorizing and matching images rather than learning the word that best describes its image. Also, in playing these types of games, there is no value added reward for prioritizing the word over the word's image. Thus, learning the word and its corresponding image is lost.

As an example, a prior art language game for learning Spanish words might have one playing card with the word "Cat" and with an image of a cat. A matching card would have the word "Gato" with an image of the same cat. Still the problem remains. There is no incentive to learn the word "Gato" over merely matching it with the image of the cat.

The subject invention provides for enhanced learning of a new word in a different language and providing a reward for prioritizing the learning of the new word prior to associating it with the word's image.

SUMMARY OF THE INVENTION

In view of the foregoing, it is a primary objective of the subject invention to provide a language skill game to emphasize the learning of words in a second language prior to matching the words with corresponding images of the words.

A key object of the invention is a player is rewarded by either a higher score or a lower time when the player is able to quickly match a word in one language with the same word in a different language rather then match the word with the word's image. The game can be used with a variety of different languages and different subjects, such as math, geography, history and the like.

Another object of the invention is the game can be formatted using playing cards of different sizes and shapes, as a board game, on a video screen connected to a computer or portable handheld electronic devices, such as a smart phone or tablet.

These and other objects of the present invention will become apparent to those familiar with educational card and computer games related to learning a new language and other related subjects when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 5 illustrates the subject educational game shown in an electronic format for playing the game on a website, a software program, a CD and the like.

DETAILED DESCRIPTION OF THE PREFERRED EMBODIMENTS

Figure 1:
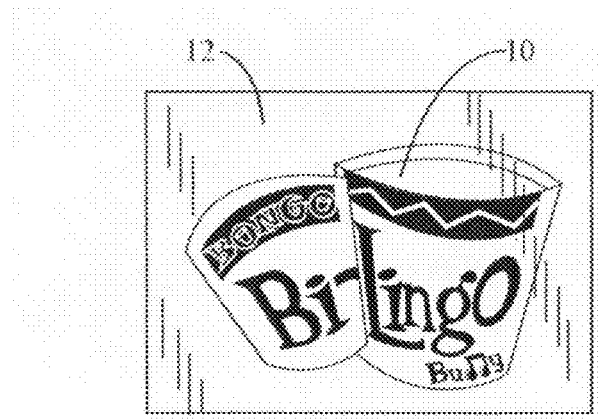
FIG. 1 is a front side of one of the educational game's playing cards with the games name, trademark or trade dress thereon.

The accompanying drawings illustrate complete preferred embodiments in the present invention according to the best modes presently devised for the practical application of the subject educational game:

In FIG. 1, a front side 10 of a first card 12 is illustrated with a game's trade dress, logo and brand name "Bongo Bi-Lingo Buddy™". The first card 12 can be from a series of like cards up to 26 cards in a typical card deck of 52 cards or more or less cards.

Figure 2:
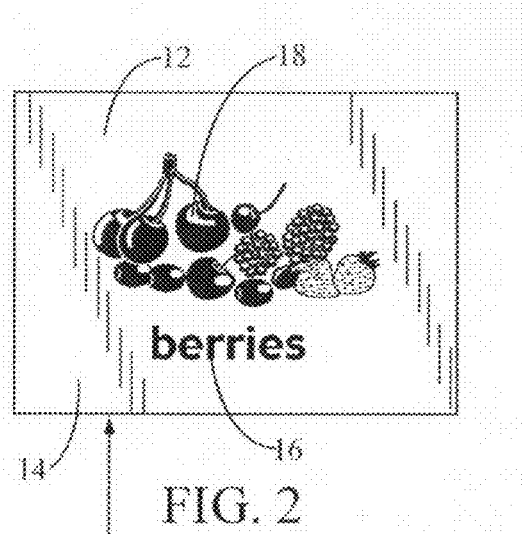
FIG. 2 is the back side of the playing card shown in FIG. 1 and illustrating an English word and its corresponding image.

In FIG. 2, the first card 12 has been turned over and a back side 14 is displayed with an English word "berries" 16 with an image 18 of berries.

Figure 3:
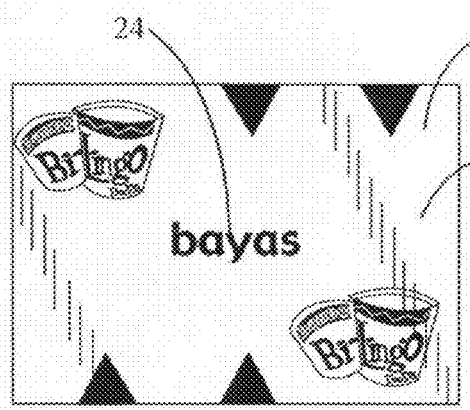
FIG. 3 is a front side of another playing card with a Spanish word thereon.

In FIG. 3, a front side 20 of a second card 22 is illustrated with a Spanish word "bayas" 24. The second card can be from a series of like cards up to 26 cards for completing the full deck of 52 cards or more or less cards. The card 22 can also include the game's trade dress, logo and brand name. In this example, the second card 22 and similar cards with Spanish words thereon, can be laid with the front side 20 face up. The cards, as mentioned above can include various subjects to be learned in a different language.

If the player has learned the word "bayas" in Spanish is the same word as "berries" in English, he or she will quickly pick the second card 22 and ignore the other cards in the game and turn this card over.

Figure 4:
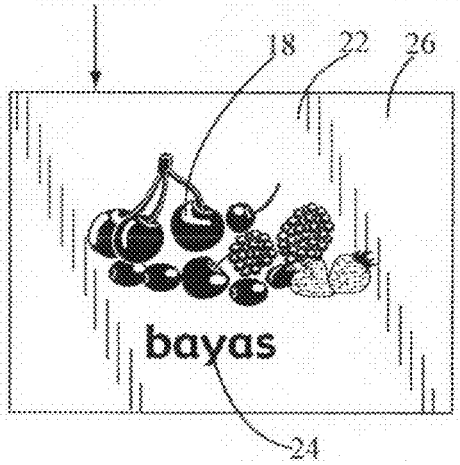
FIG. 4 is a back side of the playing card shown in FIG. 3 and illustrating the Spanish word and its corresponding image.

In FIG. 4, a back side 26 of the second card 22 is illustrated with the word "bayas" and displayed with the image 18 of the berries. By turning over the second card 22, the player can confirm to other players that there is both a match of the words "berries" and "bayas" with a match of the two images of the berries. During the play of the educational game, the players can time each other on how quickly they match all of the cards in the deck. The player taking the shortest amount of time to complete the matches is rewarded as the winner of the game.

Figure 5:
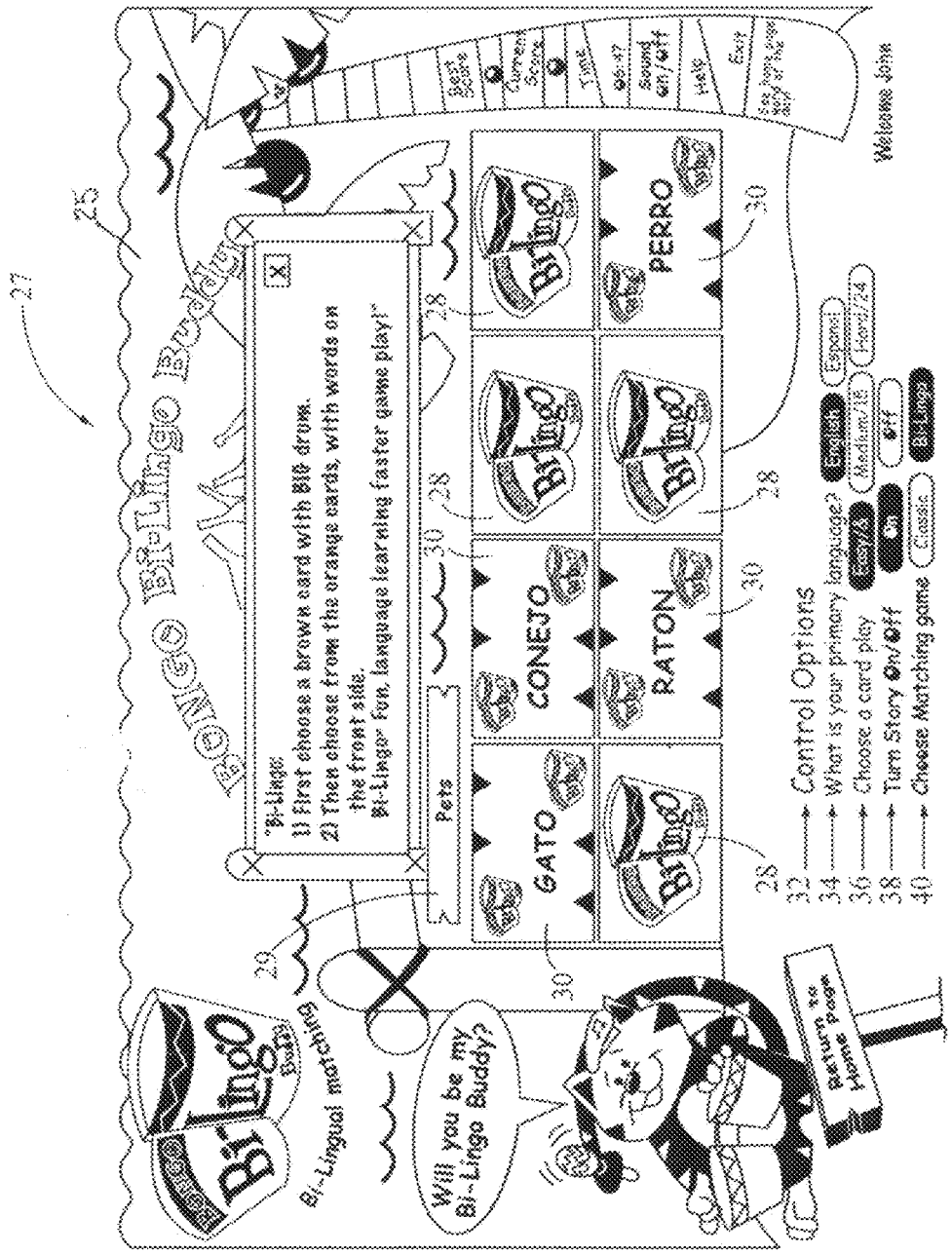

In FIG. 5, a website matching game called "Bongo Bi-Lingo Buddy" is displayed on a video screen 25 for playing the subject game online. The game is shown having a general reference numeral 27. Obviously, various types of subject matter can be selected for learning a variety of words and descriptors in a different language and different subject matter, such as math, history and geography.

In this example, there are four brown cards 28 having a BIG drum thereon, as part of the trade dress. The subject matter of Pets 29 is selected. Also, there are four orange cards 30 with four different names of animals in Spanish. While the four names of animals are shown, different subjects can be chosen as mentioned above along with any number of different names or words.

In this example, the Spanish names are "Gato", "Conejo", "Raton" and "Perro". When the player electronically clicks on the lower left brown card 28, the card turns over onto its back side and displays the word "Cat". Also, the card 28 can display an image of a cat next to the word "Cat". If the player knows that the word "Cat" is the same as the word "Gato" in Spanish, then he or she quickly clicks on the orange card 30 in the upper left side of the display.

Further, the card 30 can be turned over and display an image of a cat next to the word "Gato" with an audio reward sounded on the video screen, a visual reward displayed on the screen and with a pronunciation of the word.

Figure 6:
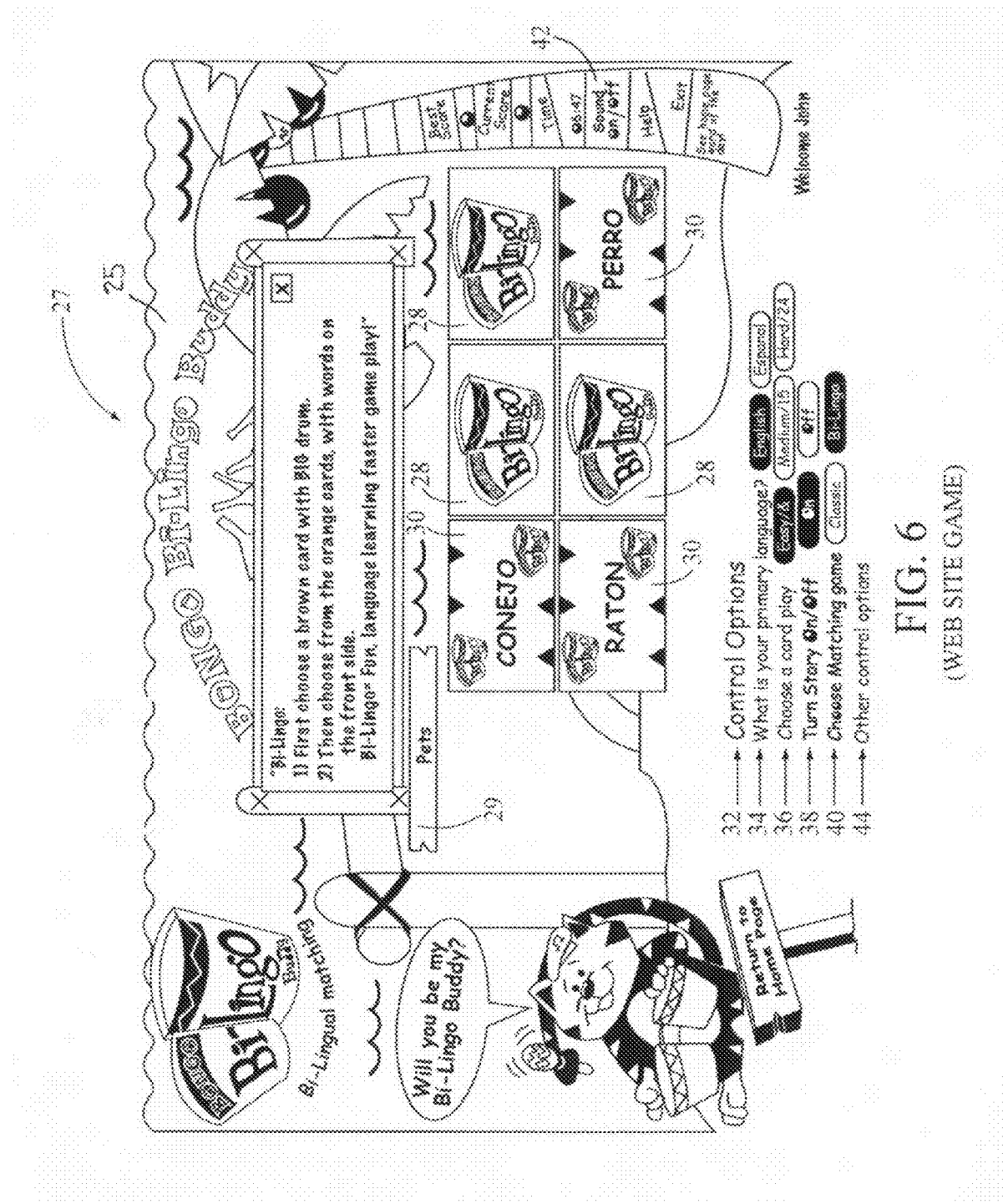
FIG. 6 illustrates the continuing play of the game in the electronic format shown in FIG. 5.

At this time, the two cards disappear from the screen as shown in FIG. 6, and the play continues. Obviously, the quicker the player matches the English and Spanish words, the lower the time or the higher or the better score in this electronic format and shown on the right side of the screen 25.

In FIG. 6, the website game 27 continues with the player clicking on another of the brown cards 28. If the back side of the brown card 28 has the word "Dog" thereon and the player knows that "Perro" is Spanish for dog, he or she will quickly click onto the orange card 30 in the lower right hand corner of the display. At this time, the player will now have another match and these two cards will disappear from the screen. The player then proceeds to match the last two brown cards with the last two orange cards with the audio and visual rewards displayed on the screen 25. Upon completion of the category of words, the player receives an audio reward, a visual reward and a story segment, which may or may not use the matching words.

When a player is playing against another player and is familiar with various Spanish words for animals and need not rely on matching images with the words, this player will complete the game in a shorter time period and be rewarded by being the winner of this particular game.

It should be noted in this electronic format of the game 27 additional features can be added to enhance the play of the game. For example, the game can include control options 32, choice of a primary language 34, choose easy, medium and hard card play 36, turning the story on/off 38 and choosing either a classic or Bi-Lingo matching game 40. Further, the format of the game 27 on the right side of the screen, can include the players best score, current score during the play of the game, time based on the start of play, turning the sound on/off, along with help/exit.

Also, other control options 44 can include word selections, other languages, other subject matter, such as math, geography, and history. Further, an audio reward and word pronunciation of the matched word can be sent via a smart phone communicating with one or more of the players playing the subject card game with app coding recognition, i.e. upc. Still further, an audio and/or visual reward with a story segment can be send via a smart phone to one or more of the players playing the subject card game via app coding recognition.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. An educational game of playing cards used by one or more players and shown in an electronic format and programmed for display on a video screen on an electronic device, the game providing for enhanced learning of words in a different language or descriptors of other educational subjects, the game comprising:
   a plurality of first cards adapted for display on the video screen, the first cards having a front side and a back side, the back side of each first card including a different selected word in a first language; and
   a plurality of second cards adapted for display on the video screen, the second cards having a front side having a different selected word in a second language;
   whereby, when the player clicks on one of the first cards with a selected word in the first language and turns it over to view a word in the first language and then clicks on a selected second card that corresponds in meaning to the word on the first card, a match is completed and the selected first and second cards disappear from the screen and play continues with the remaining cards on display.

2. The game as described in claim 1 wherein the front side of the first cards includes trade dress, trademark mark and a distinctive image thereon.

3. The game as described in claim 1 wherein the back side of the first cards include an image of the word.

4. The game as described in claim 1 wherein the back side of the second cards includes an image of the word shown on the front side of the second cards.

5. The game as described in claim 1 further including a programmed time displayed on the video screen indicating the elapsed time for a player to complete all of the matches of the first and second cards.

6. The game as described in claim 1 further including a best score by a player and displayed on the video screen.

7. The game as described in claim 1 further including an audio and a visual reward displayed on the video screen upon completion of a word match.

8. The game as described in claim 1 further including a pronunciation of the word on the second card upon a word match.

9. The game as described in claim 1 further including a short segment from the video screen using the word on the second card in a sentence upon a word match.

10. The game as described in claim 1 further including a programmed choice of easy, medium and hard selection of the first and second cards by the one or more players.

11. The game as described in claim 1 further including a programmed choice of a higher skill level of play by one player and a lower skill level of play by a second player by reversing the direction of card play.

12. An educational game of playing cards used by one or more players, the game providing for enhanced learning of words in a different language and other education subjects, the game comprising:
   a plurality of first cards in a card deck, the first cards having a front side and a back side, the back side of each first card including a different selected word in a first language and an image of the word, the first cards having app coding recognition by an electronic device; and a plurality of second cards in the card deck, the second cards having a front side and a back side, the front side of the second cards including a different selected word in a second language, the back side of second card including a different selected word in the second language and an image of the word, the second cards having app coding recognition by the electronic device;

whereby, when the player tries to match a selected word in the first language on the first card with a selected word in the second language on the second card, the player then rums over the second card and if the word and image on the second card match the word and image on the first card, the player is successful with app coding recognition from the electronic device for an audio/visual reward and word pronunciation of the matched first card and second card, the player then moves on to selecting additional first and second cards.

13. The game as described in claim 12 wherein the front side of the first cards includes trade dress, trademark mark and a distinctive image.

14. The game as described in claim 12 wherein the first cards and the second cards can include up to 52 cards for making up a complete deck of playing cards.

* * * * *